UNITED STATES PATENT OFFICE.

STERLING H. DIGGS, OF WHITING, INDIANA, ASSIGNOR TO STANDARD OIL COMPANY, OF CHICAGO, ILLINOIS, A CORPORATION OF INDIANA.

SEPARATION OF PETROLEUM-OIL SLUDGES.

1,418,781.   Specification of Letters Patent.   Patented June 6, 1922.

No Drawing.   Application filed December 23, 1918. Serial No. 268,071.

*To all whom it may concern:*

Be it known that I, STERLING H. DIGGS, a citizen of the United States, residing at Whiting, in the county of Lake and State of Indiana, have invented a new and useful Improvement in Separation of Petroleum-Oil Sludges, of which the following is a specification.

This invention relates to the art of refining petroleum oils and is particularly directed to the treatment of the acid sludge resulting from the agitation of such oils with sulphuric acid. The invention will be fully understood from the following specification.

In the manufacture of lubricants from petroleum oil, for example, American mid-continent crude petroleum, the crude oil is subjected to distillation with fire and steam down to a bottom of 80 to 85 per cent, that is, until 15 to 20 per cent of the oil has been distilled off. The steam reduced crude resulting from this first operation is now agitated with from one-third of one pound to one pound per gallon of sulphuric acid 66° B. As the result of such acid treatment there is produced a sludge which separates from the oil body drawn from the acid agitator. The present invention is particularly directed to the treatment of such acid sludge.

The sludge is pumped into an agitator where it mixes with water (10% on the mass of sludge), or weak sulphuric acid, that is, acid of a gravity less than 8° B. (15% on the mass of sludge), gas oil, and a product which is identified as fuming acid sludge. The gas oil referred to is a mixture of heavy petroleum oils having a boiling point of approximately from 500 to 700° F. and is used in the proportion of about 20 to 50 per cent on the mass of the sludge to be treated. The fuming acid sludge referred to is produced by the action of relatively large quantities of fuming sulphuric acid upon heavy petroleum oils of the character used for medicinal purposes under the name of "White oil" or "Liquid paraffine," as produced, for example, by the process described in the patent of Robert E. Humphreys, No. 1,286,179, of November 26, 1918. It is preferred that prior to its use in the present process, the fuming acid sludge referred to should have separated from it the bulk of sulphuric acid which it contains. This may be readily accomplished by the addition of water to the sludge, the thorough boiling of the mixture and settling. As the result of this treatment, the sulphuric acid content of the sludge in large part comes out in dilute aqueous solution (about 15° B.) in the base of the settling tank, the stratification being relatively perfect. The fuming acid sludge obtained and treated in the manner above described is used in the present process to the extent of from 5 to 35 per cent on the mass of the oil sludge under treatment.

The mixture of oil sludge, fuming acid sludge, gas oil and water or weak acid having been made as above described, is now steamed until it is nearly at the boiling temperature. The sulphuric acid contained in the sludge will now in large part separate out at the bottom of the tank in the form of about 30° B. acid. This 30° acid is now drawn off, more water or weak acid added and the mixture again steamed, after which there is a second stratification and a further quantity of acid of a gravity less than 30° B. may be drawn off. This process may be repeated until the gravity of the acid recovered is from 8 to 10° B. beyond which stage it is unnecessary to proceed.

The product now remaining in the separator forms two layers. The upper layer which is called tar consists of a solution of asphaltines in gas oil. The lower layer consists of asphaltic products and mineral oil sulphonic acids, and contains in addition from 20 to 30 per cent of weak sulphuric acid (about 9° B.), together with small quantities of oil. Both the upper and lower layers are suitable for the production of commercial asphalt, the best results being secured by drawing them off separately and treating each layer by the method best suited to its character.

In the use of the above described process for the treatment of sludge, it should be noted that the proportion of fuming acid sludge employed within substantially the limits given, should be controlled by the following considerations. The larger the percentage of fuming acid sludge employed, the quicker the separation of the oil sludge into the two layers, but the more difficult the recovery of the acid therefrom, particularly the weaker acid resulting from successive additions of water and steaming. Conversely the smaller the proportion of fuming acid sludge employed, the longer period required for the separation of the oil sludge, but the greater the facility with which the last traces of acid may be removed therefrom.

The fuming acid sludge described in the foregoing as being employed for the separation of the sludge resulting from the treatment of petroleum oil with 66° B. sulphuric acid in the ordinary manner is believed to consist essentially of a mixture of petroleum oil sulphonic acids.

While in the foregoing there is described a particular process in accordance with the present invention, it will be understood this is illustrative only and that the invention should not be regarded as limited to the exact procedure described, except in so far as such limitations form a part of the accompanying claims, in which it is the intention to claim all novelty inherent in the invention as broadly as is permissible in view of the prior art.

What is claimed is:—

1. The method of treating petroleum oil sludge for the separation thereof which consists in intimately mixing said sludge with water and mineral oil sludge sulphonic acid of the character derived from the fuming acid treatment of mineral oils, heating, and subsequently permitting the mixture to stratify.

2. The method of treating petroleum oil sludge for separation thereof which consists in intimately mixing said sludge with heavy petroleum oil, water, and mineral oil sludge sulphonic acid of the character derived from the fuming acid treatment of mineral oils, heating, and subsequently permitting the mixture to stratify.

3. The method of treating petroleum oil sludge for the separation thereof which consists in adding to the sludge a heavy petroleum oil, water, and mineral oil sludge sulphonic acid of the character derived from fuming acid treatment of mineral oil, simultaneously agitating and heating the mixture, and subsequently permitting it to cool and stratify.

4. The method of treating petroleum oil sludge for the separation thereof which consists in admixing with said sludge heavy petroleum oil, water, and fuming acid sludge, agitating the mixture with steam, permitting the mixture to cool and stratify, drawing off the resultant dilute sulphuric acid, adding water, and repeating the process until the bulk of the sulphuric acid is separated from the sludge.

5. The method of treating the acid sludge of steam-reduced crude petroleum oil which consists in adding thereto water, gas oil and fuming acid sludge, agitating the mixture with steam, stratifying, drawing off the sulphur acid layer from the bottom, adding a further quantity of water and repeating the process until the bulk of the sulphuric acid has been removed.

6. The method of treating the acid sludge of steam-reduced crude petroleum oil which consists in adding thereto water, gas oil and fuming acid sludge, agitating the mixture with steam, stratifying, drawing off the sulphuric acid layer from the bottom, adding a further quantity of water and repeating the process until the bulk of the sulphuric acid has been removed, and finally drawing off separately the upper and lower layers of the treated sludge.

STERLING H. DIGGS.